US012665975B2

(12) United States Patent
Iwata

(10) Patent No.: US 12,665,975 B2
(45) Date of Patent: Jun. 23, 2026

(54) IMAGE CAPTURING APPARATUS, IMAGE CAPTURING SYSTEM, AND CONTROL METHOD

(71) Applicant: CANON KABUSHIKI KAISHA, Tokyo (JP)

(72) Inventor: Katsuya Iwata, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 24 days.

(21) Appl. No.: 18/915,424

(22) Filed: Oct. 15, 2024

(65) Prior Publication Data

US 2025/0133176 A1 Apr. 24, 2025

(30) Foreign Application Priority Data

Oct. 20, 2023 (JP) ................................ 2023-181220

(51) Int. Cl.
*H04N 1/44* (2006.01)
*G06F 21/62* (2013.01)

(52) U.S. Cl.
CPC ....... *H04N 1/4486* (2013.01); *G06F 21/6209* (2013.01); *H04N 1/444* (2013.01); *H04N 1/4453* (2013.01); *H04N 1/4473* (2013.01); *H04N 2201/0084* (2013.01); *H04N 2201/218* (2013.01); *H04N 2201/3278* (2013.01); *H04N 2201/3281* (2013.01)

(58) Field of Classification Search
CPC ... H04N 2201/3281; H04N 2201/3278; H04N 2201/218; H04N 2201/0084; H04N 1/4473; H04N 1/4453; H04N 1/444; H04N 1/4486; H04N 5/222; G06F 21/6209; G06F 21/602; G06F 12/1408; H04W 12/04
USPC .................................................... 348/333.12
See application file for complete search history.

(56) References Cited

U.S. PATENT DOCUMENTS 10,057,768 B1 * 8/2018 Furuichi ............... H04L 63/045
2003/0193602 A1 * 10/2003 Satoh ................ H04N 1/00488 348/333.12
2024/0427517 A1 * 12/2024 Aoki .................... H04N 1/2104

FOREIGN PATENT DOCUMENTS

JP 2013140601 A 7/2013
JP 2021064886 A 4/2021

* cited by examiner

*Primary Examiner* — Xi Wang
(74) *Attorney, Agent, or Firm* — Carter, DeLuca & Farrell LLP

(57) ABSTRACT

An image capturing apparatus receives a request for image capturing commission from an information processing apparatus, saves a captured image file obtained by image capturing, transmits the captured image file, to the information processing apparatus and disable access to the saved captured image file.

15 Claims, 11 Drawing Sheets

⌐100

IMAGE CAPTURING APPARATUS

⌐150

INFORMATION PROCESSING APPARATUS

S301 : START RECEPTION OF IMAGE CAPTURING COMMISSION

S302 : TRANSMIT REQUEST FOR CONNECTION

S303 : TRANSMIT REQUEST FOR IMAGE CAPTURING COMMISSION

S304 : TRANSMIT ACCEPTANCE NOTIFICATION

S305 : GENERATE TEMPORARY SAVE AREA

S306 : SET SAVE DESTINATION OF CAPTURED IMAGE FILE TO TEMPORARY SAVE AREA

S307 : PERFORM IMAGE CAPTURING PROCESSING AND SAVE CAPTURED IMAGE FILE

S308 : TRANSMIT REQUEST FOR FILE TRANSFER

S309 : SELECT CAPTURED IMAGE FILE

S310 : TRANSFER (TRANSMIT) CAPTURED IMAGE FILE

S311 : DELETE CAPTURED IMAGE FILE IN TEMPORARY SAVE AREA

S312 : TRANSMIT DISCONNECTION NOTIFICATION

S313 : TERMINATE Web SERVER SERVICE

S314 : SET SAVE DESTINATION OF CAPTURED IMAGE FILE TO NORMAL SAVE AREA

S315 : DELETE TEMPORARY SAVE AREA

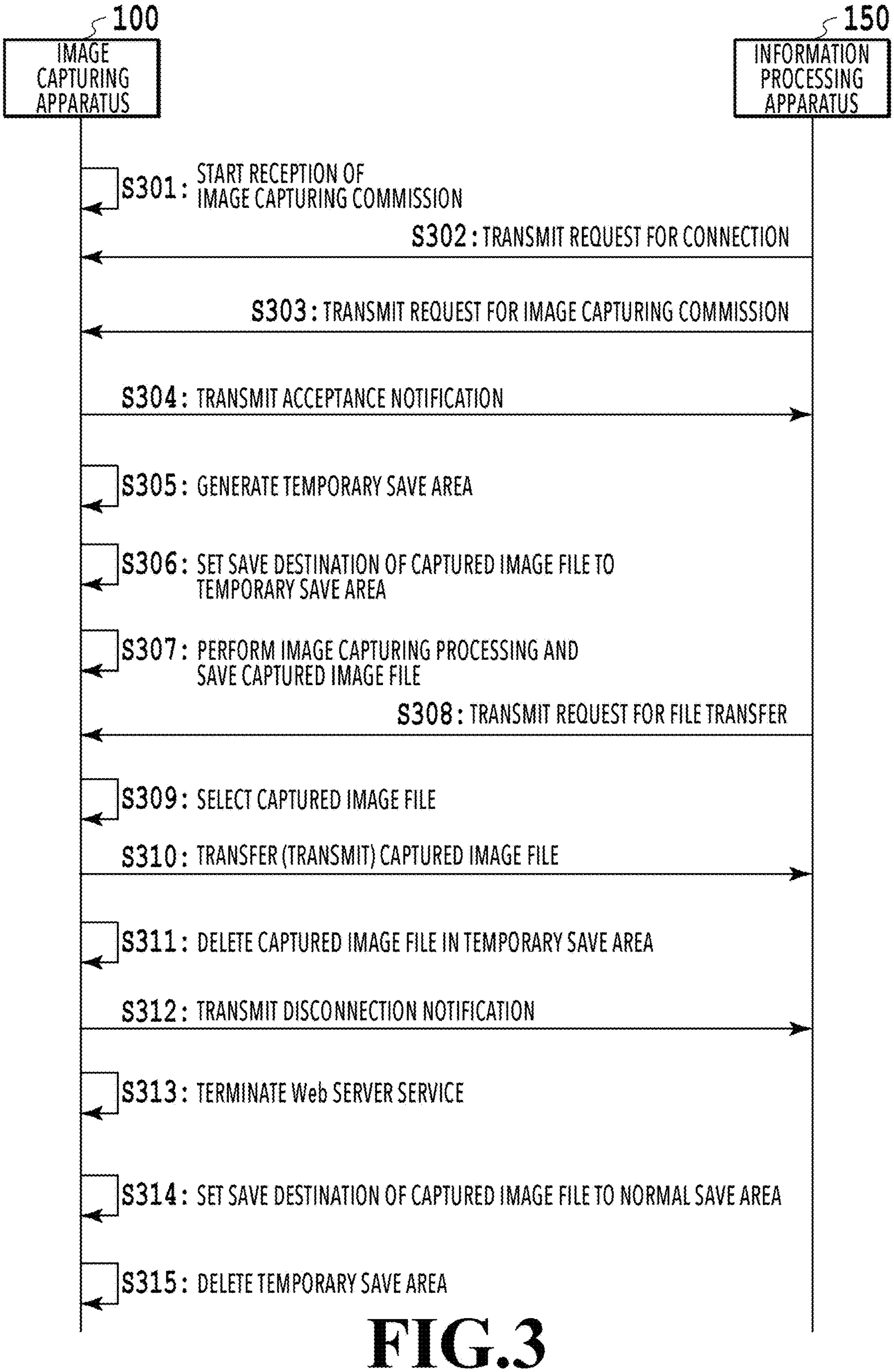

FIG.3

IMAGE CAPTURING APPARATUS, IMAGE CAPTURING SYSTEM, AND CONTROL METHOD

BACKGROUND

Field

The present disclosure relates to security of a captured image file that is obtained by image capturing.

Description of the Related Art

After a person commissions a photographer, who is just a passerby, to capture the person him/herself in sightseeing spots, in town and the like, or after a person commissions a photographer to capture the person him/herself in a memorial image capturing booth in theme parks and the like, there is a case where the person receives the data of the captured image as a captured image file. In the case such as this, on a condition that the captured image file remains in the image capturing apparatus of the photographer, there is a possibility that the captured image file is used for another purpose, such as that the captured image file is uploaded to SNS (Social Networking Service) and utilized by the photographer without permission.

Japanese Patent Laid-Open No. 2013-140601 (in the following, called "Patent Document 1") has disclosed a technique to limit the use of a captured image file by registering in advance a plurality of user accounts in an image capturing apparatus and displaying a list of only captured image files for which image capturing has been performed with a registered user account after authentication of the user account has been performed. According to the technique disclosed in Patent Document 1, it is possible to suppress a captured image file for which image capturing has been performed with a certain user account from being used for another purpose by another user corresponding to another user account against the intention of the user corresponding to the relevant user account.

SUMMARY

With the technique disclosed in Patent Document 1, there is such a problem that it is necessary to perform a complicated work, such as registering a user account corresponding to a person having commissioned image capturing each time a temporary image capturing commission is received. Consequently, an object of the present disclosure is to provide a technique to suppress a captured image file from being used for another purpose without permission of a person having commissioned image capturing while suppressing a complicated work in a case where a temporary image capturing commission is received.

The image capturing apparatus of the present disclosure receives a request for image capturing commission from an information processing apparatus, saves a captured image file obtained by image capturing, transmits the captured image file, to the information processing apparatus, and disables access to the saved captured image file, by concealing the saved captured image file based on an encryption key.

Further features of various embodiments will become apparent from the following description of exemplary embodiments with reference to the attached drawings.

BRIEF DESCRIPTION OF THE DRAWINGS

FIG. 3 is a sequence diagram showing one example of a flow of processing of the image capturing system according to Embodiment 1;

DESCRIPTION OF THE EMBODIMENTS

Hereinafter, with reference to the attached drawings, the present disclosure explains some example embodiments in detail. Configurations shown in the following embodiments are merely exemplary and some embodiments of the present disclosure are not limited to the configurations shown schematically. Note that identical components will be described with the same reference sign given thereto.

Embodiment 1

Figure 1:
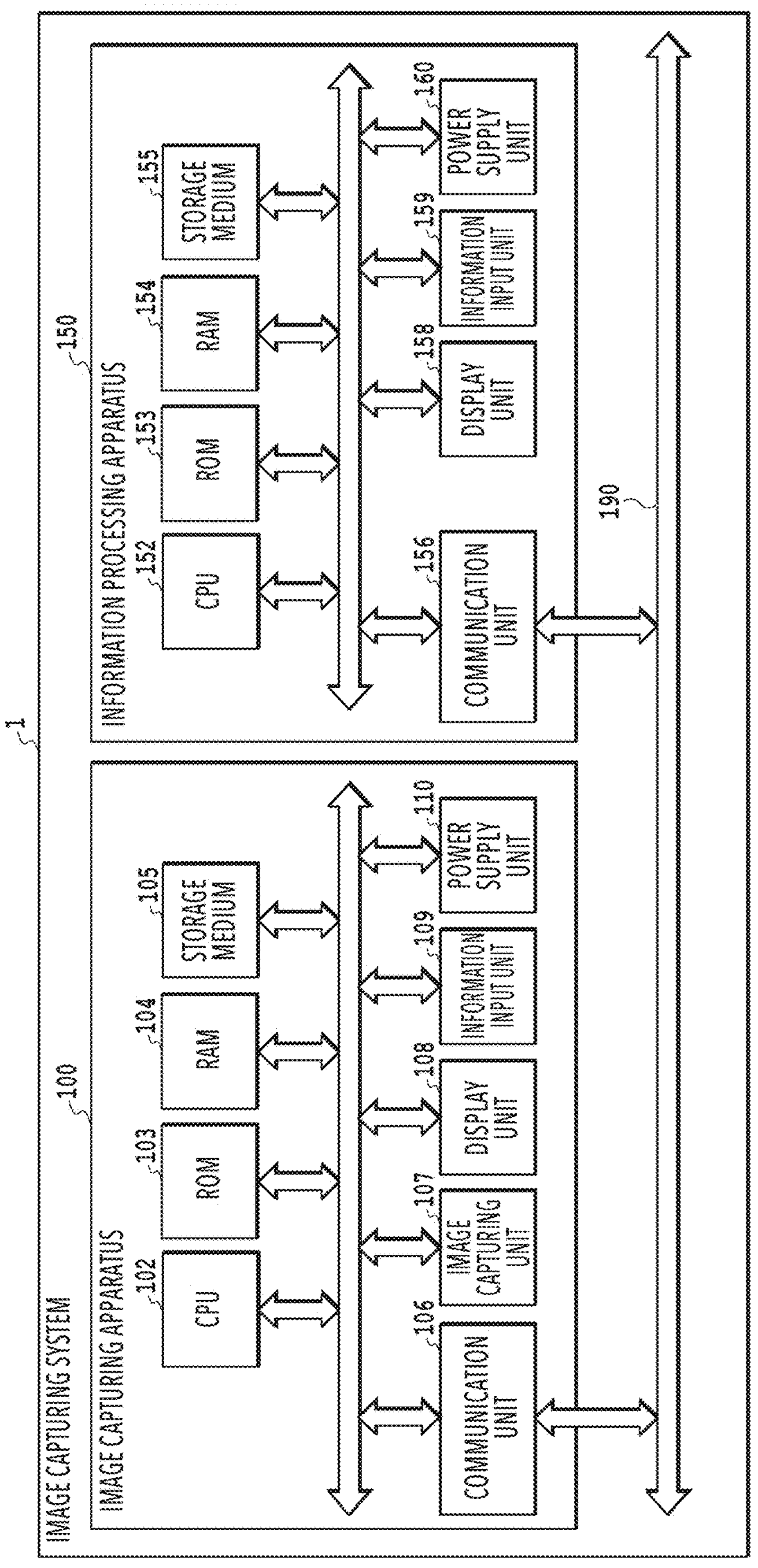
FIG. 1 is a block diagram showing one example of a hardware configuration of each apparatus of an image capturing system according to Embodiment 1.

FIG. 1 is a block diagram showing one example of the hardware configuration of each apparatus of an image capturing system 1 according to Embodiment 1. The image capturing system 1 has an image capturing apparatus 100 and an information processing apparatus 150. The image capturing apparatus 100 includes a digital still camera, a digital video camera or the like and performs image capturing based on a user operation and stores data of a captured image obtained by image capturing as a captured image file. The image capturing apparatus 100 has a CPU 102, a ROM 103, a RAM 104, a storage medium 105, a communication unit 106, an image capturing unit 107, a display unit 108, an information input unit 109, and a power supply unit 110 and each is connected to one another via a bus so that communication is possible.

The CPU 102 is a control unit including at least one processor or circuit and controls the whole image capturing apparatus 100. The ROM 103 is a memory capable of electrically erasing and storing data and stores data of constants for the operation of the CPU 102, programs and the like. The programs described here are computer programs for performing processing to be described later in the image capturing apparatus 100. The RAM 104 is a memory used as a work area of the CPU 102 and stores data of constants and variables for the operation of the CPU 102, programs read from the ROM 103, and the like. The storage medium 105 includes a semiconductor memory or the like such as a memory card and stores data of a captured image obtained by image capturing as a captured image file.

The communication unit 106 is an interface for communicating with an external device, such as network equipment or a USB (Universal Serial Bus) device, and performs transmission and reception of data with an external device via a computer network or a communication line 190 such as a dedicated line. In the following, explanation is given on the assumption that the communication unit 106 communicates with an external device via LAN (Local Area Network), but the communication with an external device is not limited to that via LAN. For example, it may also be possible for the communication unit 106 to communicate with an external device via another type of computer network, such as WAN (Wide Area Network).

The image capturing unit 107 is an image sensor including at least one image capturing element, such as a CCD (Charge Coupled Device) element or a CMOS (Complementary Metal-Oxide-Semiconductor) element, and converts an optical image into an electric signal. The display unit 108 includes an LED (Light Emitting Diode), a liquid crystal panel or the like and displays a captured image, the state of the image capturing apparatus 100, or the like. The information input unit 109 includes a touch panel, a button switch or the like and receives operation inputs from a user. The power supply unit 110 includes a built-in battery such as a lithium ion battery, or a battery such as a removable portable battery, and supplies power to the image capturing apparatus 100. The power supply unit 110 may have a configuration in which power is supplied to the image capturing apparatus 100 by using power supplied from the outside, such as an AC power supply. The CPU 102 also operates as a control unit configured to control each of the image capturing unit 107, the display unit 108, and the information input unit 109.

The information processing apparatus 150 includes a smartphone, a tablet terminal device, a laptop computer or the like. The information processing apparatus 150 has a CPU 152, a ROM 153, a RAM 154, a storage medium 155, a communication unit 156, a display unit 158, an information input unit 159, and a power supply unit 160 and each is connected to one another via a bus so that communication is possible. The hardware of the information processing apparatus 150 has the same features as those of the hardware with the same name of the image capturing apparatus 100, but the hardware of the information processing apparatus 150 does not need to be the same type of hardware as that of the image capturing apparatus 100.

Figure 2:
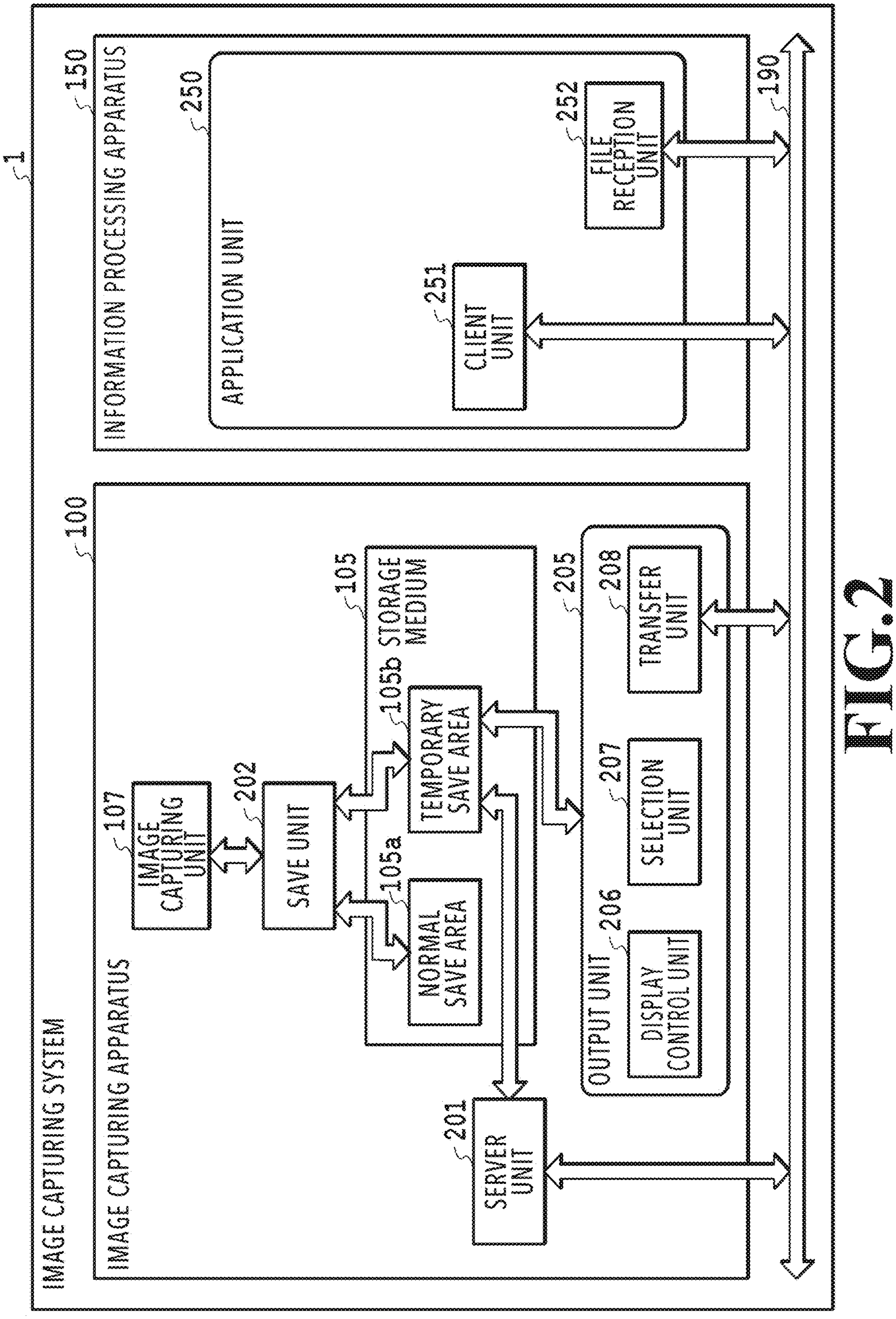
FIG. 2 is a block diagram showing one example of a function configuration of each apparatus of the image capturing system according to Embodiment 1.

FIG. 2 is a block diagram showing one example of the function configuration of the image capturing apparatus 100 and the information processing apparatus 150 in the image capturing system 1 according to Embodiment 1. The image capturing apparatus 100 has the image capturing unit 107, a server unit 201, a save unit 202, and an output unit 205 as the function configuration. The output unit 205 has a display control unit 206, a selection unit 207, and a transfer unit 208. A normal save area 105*a* and a temporary save area 105*b* in the storage medium 105 shown in FIG. 2 will be described later. The information processing apparatus 150 has an application unit 250. The application unit 250 has a client unit 251 and a file reception unit 252.

The server unit 201 operates as a WEB server, such as an HTTP server or an HTTPS server, and provides Web services to an external device, such as the information processing apparatus 150. The server unit 201 may provide connection by another connection method, such as Bluetooth (registered trademark), in place of the connection method by HTTP or HTTPS. The client unit 251 of the information processing apparatus 150 connects to the server unit 201 configured to provide Web services as a Web server and performs data communication with the server unit 201.

The save unit 202 obtains a captured image based on an electric signal corresponding to an optical image that the image capturing unit 107 outputs and obtains a captured image file by encoding the obtained captured image into the format, such as JPEG or RAW, in a case where the obtained captured image is a still image, or encoding the obtained captured image into the format, such as MP4 or MOV, in a case where the obtained captured image is a moving image. Further, the save unit 202 saves the obtained captured image file in the storage medium 105. The storage medium 105 has the normal save area 105*a* and the temporary save area 105*b* as save areas of a captured image file. The normal save area 105*a* serves as a save destination of a captured image file captured by the image capturing unit 107 and obtained by the save unit 202 in a period during which the client unit 251 is not connected to the server unit 201 (in the following, called "non-connection period"). The temporary save area 105*b* serves as a save destination of a captured image file captured by the image capturing unit 107 and obtained by the save unit 202 in a period during which the client unit 251 is connected to the server unit 201 (in the following, called "connection period"). Details of the connection period and the non-connection period will be described later.

The display control unit 206 displays a captured image file and the like saved in the storage medium 105 on the display unit 108. The selection unit 207 selects a captured image file that is transferred to the information processing apparatus 150 from among one or more captured image files saved in the temporary save area 105*b*. Specifically, for example, a user of the image capturing apparatus 100 performs an operation to select a captured image file that the user desires to transfer to the information processing apparatus 150 by using the information input unit 159 from among one or more captured image files displayed on the display unit 108. The selection unit 207 selects a captured image file based on the operation. The transfer unit 208 transfers (transmits) the data of the captured image file selected by the selection unit 207 to the information processing apparatus 150. The file reception unit 252 of the information processing apparatus 150 receives the data of the captured image file transferred from the transfer unit 208.

Figure 4:
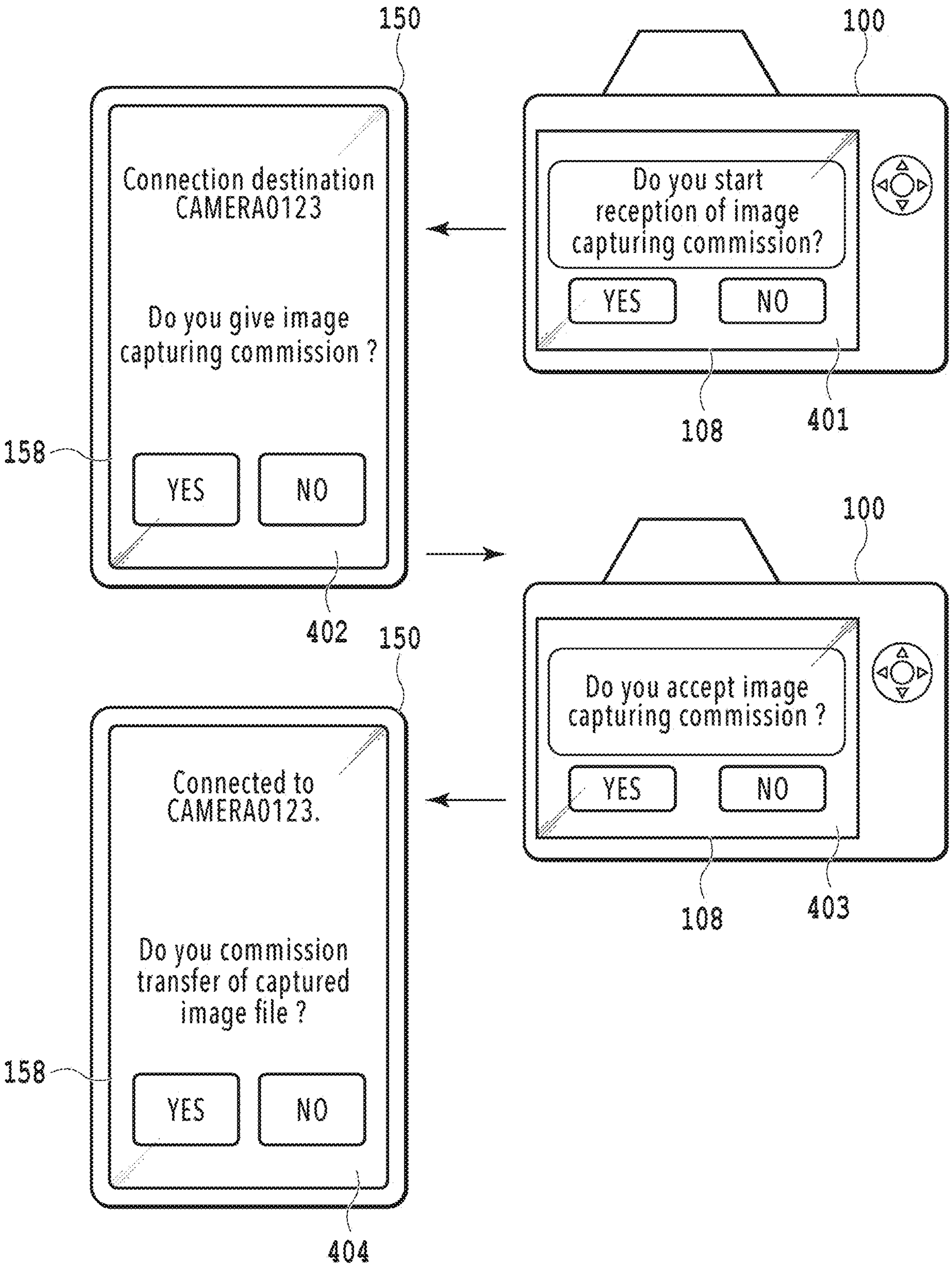
FIG. 4 is a diagram showing one example of screen transition according to Embodiment 1.

With reference to FIG. 3 to FIG. 6, the processing of the image capturing apparatus 100 and the information processing apparatus 150 during the connection period is explained. FIG. 3 is a sequence diagram showing one example of a flow of processing of the image capturing system 1 according to Embodiment 1, Further, FIG. 4 is a diagram showing one example of screen transition on the display unit 108 of the image capturing apparatus 100 and on the display unit 158 of the information processing apparatus 150 according to Embodiment 1. In the following explanation, a symbol "S" means a step (process).

In a case where a user of the image capturing apparatus 100 selects an image capturing commission reception mode by using the information input unit 109, the image capturing apparatus 100 displays a screen on the display unit 108, which is for checking whether or not to start reception of a temporary image capturing commission (in the following, called "image capturing commission"). In the following, this screen is called a start check screen 401. The start check screen 401 includes a "YES" button indicating consent to the start of reception of an image capturing commission and a "NO" button indicating refusal to start reception of an image capturing commission. In a case where a user of the image capturing apparatus 100 presses down the "YES" button on the start check screen 401 by using the information input unit 109, processing in the sequence diagram shown in FIG. 3 is started. First, at S301, the server unit 201 of the image capturing apparatus 100 starts provision of WEB services and starts reception of an image capturing commission.

On the other hand, in a case where a user of the information processing apparatus 150 selects an image capturing commission mode by using the information input unit 159, the information processing apparatus 150 displays a screen on the display unit 158, which is for checking whether or not to execute an image capturing commission (in the following, called "commission check screen 402"). The commission check screen 402 includes a "YES" button indicating that an image capturing commission is executed and a "NO" button indicating that an image capturing commission is not executed. In a case where a user of the information processing apparatus 150 presses down the "YES" button on the commission check screen 402 by using the information input unit 159, at S302, the client unit 251 of the information processing apparatus 150 transmits a request for connection to the server unit 201 of the image capturing apparatus 100 and after that, connection is established. It may also be possible for the commission check screen 402 to include information enabling unique identification of the image capturing apparatus 100, such as an apparatus ID of the image capturing apparatus 100 of the connection destination or a network ID, so that it is possible to check that the connection destination of the information processing apparatus 150 is correct.

After the connection with the image capturing apparatus 100 is established, at S303, the client unit 251 of the information processing apparatus 150 transmits (POST) a request for image capturing commission (in the following, called "image capturing commission request") to the server unit 201 of the image capturing apparatus 100. The image capturing commission request transmitted from the information processing apparatus 150 is received by the server unit 201 of the image capturing apparatus 100. In a case of receiving the image capturing commission request, the image capturing apparatus 100 displays a screen on the display unit 108, which is for checking whether or not to accept the image capturing commission (in the following, called "acceptance check screen 403"). The acceptance check screen 403 includes a "YES" button indicating that the image capturing commission is accepted and a "NO" button indicating that the image capturing commission is rejected. In a case where a user of the image capturing apparatus 100 presses down the "YES" button on the acceptance check screen 403 by using the information input unit 109, at S304, the image capturing apparatus 100 transmits an acceptance notification indicating that the image capturing commission has been accepted to the information processing apparatus 150.

After S304, at S305, the save unit 202 of the image capturing apparatus 100 newly creates the temporary save area 105*b* in the storage medium 105. Next, at S306, the save unit 202 of the image capturing apparatus 100 sets the save destination of the captured image file to the temporary save area 105*b* created at S305. Further, in a case of receiving the acceptance notification, the information processing apparatus 150 displays a screen on the display unit 158, which is for checking whether or not to make a transfer request for a captured image file (in the following, called "transfer request screen 404"). The transfer request screen 404 will be described later. After S306, a user of the image capturing apparatus 100 performs image capturing by using the image capturing apparatus 100 in response to the commission of a user of the information processing apparatus 150. Specifically, in a case where the shutter button of the image capturing apparatus 100 is pressed down by a user of the image capturing apparatus 100, at S307, the image capturing apparatus 100 performs the following processing. Specifically, the image capturing apparatus 100 performs image capturing processing, obtains a captured image file corresponding to the captured image obtained by image capturing, and saves the obtained captured image file in the storage medium 105.

Figure 5:
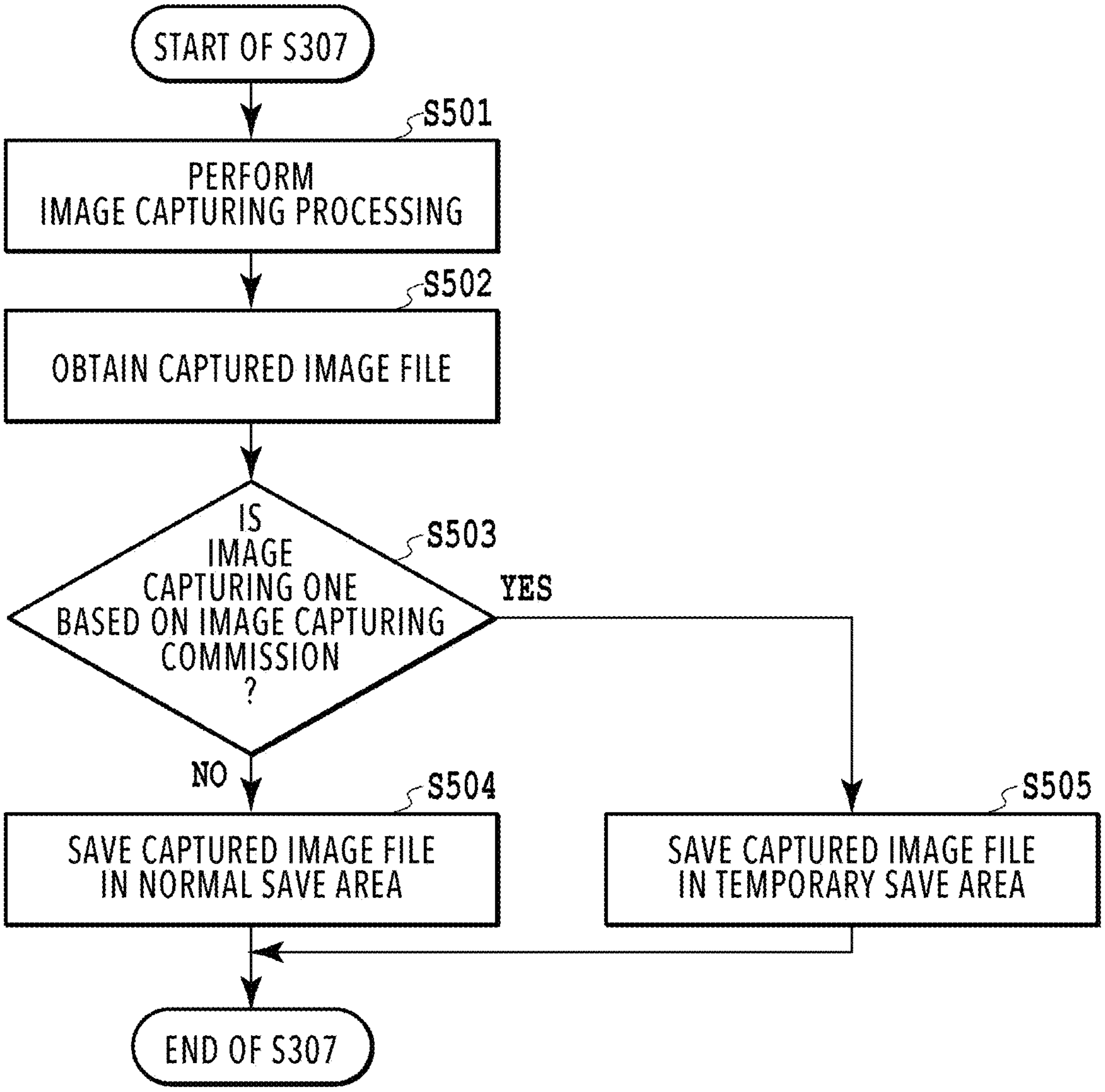
FIG. 5 is a flowchart showing one example of a processing flow at S307 shown in FIG. 3.

With reference to FIG. 5, details of the processing at S307 by the image capturing apparatus 100 is explained. FIG. 5 is a flowchart showing one example of a flow of a series of processing in the image capturing by the image capturing apparatus 100 according to Embodiment 1 and is a flowchart showing one example of a processing flow at S307 shown in FIG. 3. In a case where the shutter button of the image capturing apparatus 100 is pressed down by a user of the image capturing apparatus 100, first, at S501, the image capturing apparatus 100 performs image capturing processing. Specifically, in a case where the shutter button of the image capturing apparatus 100 is pressed down, the image capturing unit 107 is exposed and the image capturing unit 107 outputs an electric signal corresponding to an optical image. Next, at S502, the save unit 202 obtains a captured image file based on the electric signal output by the image capturing unit 107.

Next, the image capturing apparatus 100 saves the captured image file in the storage medium 105. Specifically, at S503, the save unit 202 determines whether or not the image capturing processing at S501 is image capturing based on an image capturing commission, that is, whether or not the image capturing processing at S501 is image capturing during the connection period. In a case where it is determined that the image capturing processing is not image capturing based on an image capturing commission at S503, that is, in a case where it is determined that the image capturing processing at S501 is not image capturing during the connection period, at S504, the save unit 202 saves the captured image file obtained at S502 in the normal save area 105*a* in the storage medium 105. In a case where it is determined that the image capturing processing is image capturing based on an image capturing commission at S503, that is, in a case where it is determined that the image capturing processing at S501 is image capturing during the connection period, at S505, the save unit 202 saves the captured image file obtained at S502 in the temporary save area 105*b* in the storage medium 105. In a case of the present embodiment, the save destination of the captured image file is set to the temporary save area 105*b* at S306, and therefore, the captured image file is saved in the temporary save area 105*b*. After the processing at S504 or S505, the image capturing apparatus 100 terminates the processing of the flowchart shown in FIG. 5, that is, the processing at S307 shown in FIG. 3.

After S307, at S308, the client unit 251 of the information processing apparatus 150 transmits a file transfer request for requesting transmission (transfer) of a captured image file to the image capturing apparatus 100. Specifically, for example, a user of the information processing apparatus 150 causes the information processing apparatus 150 to perform transmission of a file transfer request by using the transfer request screen 404 that is displayed on the display unit 158 of the information processing apparatus 150. More specifically, for example, a user of the information processing apparatus 150 presses down the "YES" button for causing the information processing apparatus 150 to perform transmission of a file transfer request, which is included on the transfer request screen 404. In a case where the "YES" button on the transfer request screen 404 is pressed down, the information processing apparatus 150 transmits a file transfer request to the image capturing apparatus 100. The processing at S308 may be performed at any timing provided that the timing is after the processing at S304 and before the processing at S310 to be described later.

Next, at S309, the selection unit 207 of the image capturing apparatus 100 selects a captured image file that is transferred to the information processing apparatus 150. For example, a user of the image capturing apparatus 100 performs the operation to select a captured image file by using a screen for selecting a captured image file, which is displayed on the display unit 108 but not shown schematically, and the information input unit 109 and the selection unit 207 selects a captured image file based on the input of the operation. Next, at S310, the transfer unit 208 of the image capturing apparatus 100 transfers (transmits) the data of the captured image file selected at S309 to the information processing apparatus 150. The data of the captured image file transmitted from the image capturing apparatus 100 is received by the file reception unit 252 of the information processing apparatus 150. After S310, in the image capturing apparatus 100 and the information processing apparatus 150, termination processing in the series of processing based on the image capturing commission is performed.

Figure 6:
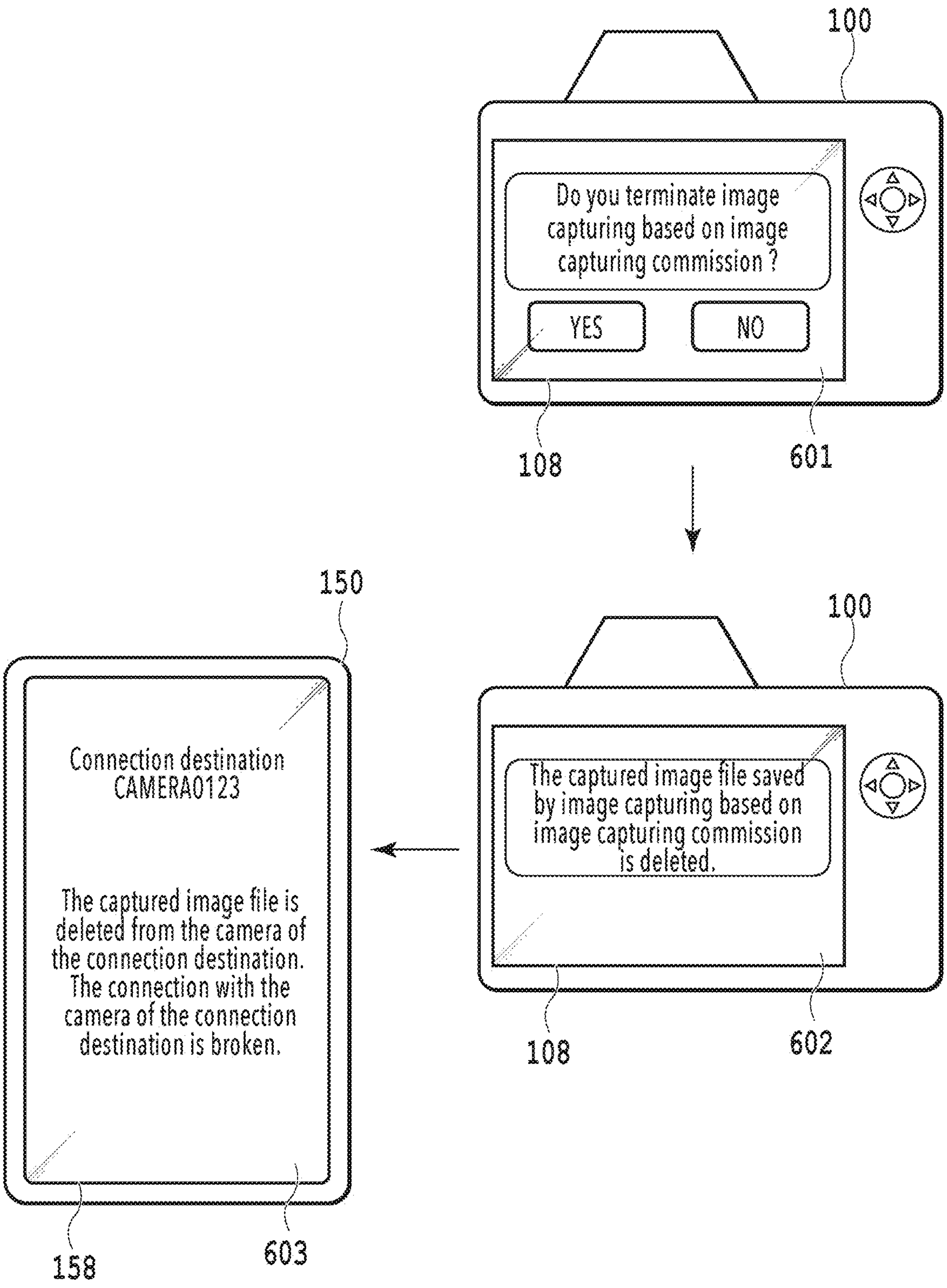
FIG. 6 is a diagram showing one example of screen transition according to Embodiment 1.

FIG. 6 is a diagram showing one example of screen transition on the display unit 1088 of the image capturing apparatus 100 and on the display unit 158 of the information processing apparatus 150 and is a diagram showing one example of screen transition in a case of the termination processing in the series of processing based on an image capturing commission according to Embodiment 1. After S310, for example, the image capturing apparatus 100 displays a screen on the display unit 108, which is for checking with a user of the image capturing apparatus 100 whether or not to terminate image capturing commissioned temporarily (in the following, called "termination check screen 601"). The termination check screen 601 includes, for example, a "YES" button indicating consent to the termination of image capturing commissioned temporarily and a "NO" button indicating refusal to terminate image capturing commissioned temporarily.

In a case where the "NO" button on the termination check screen 601 is pressed down by a user of the image capturing apparatus 100, for example, the processing at S307 to S310 may be performed repeatedly until the "YES" button on the termination check screen 601 is pressed down. In a case where the "YES" button on the termination check screen 601 is pressed down by a user of the image capturing apparatus 100, at S311, the save unit 202 of the image capturing apparatus 100 deletes all the captured image files saved in the temporary save area 105*b* of the storage medium 105. In a case where the deletion of the captured image files is completed at S311, the image capturing apparatus 100 displays a deletion completion screen 602 on the display unit 108, which indicates that all the captured image files obtained based on the commission of image capturing and saved in the storage medium 105 have been deleted.

After S311, at S312, the server unit 201 of the image capturing apparatus 100 transmits a disconnection notification indicating that the connection between the image capturing apparatus 100 and the information processing apparatus 150 is broken to the information processing apparatus 150. In a case where the client unit 251 of the information processing apparatus 150 receives the disconnection notification, the information processing apparatus 150 displays a commission completion screen 603 on the display unit 158, which indicates that the captured image files saved in the image capturing apparatus 100 have been deleted and that the connection with the image capturing apparatus 100 has been broken. By the commission completion screen 603 being displayed, it is possible for a user of the information processing apparatus 150 to recognize that the captured image files based on the image capturing commission have been deleted and are no longer used for another purpose, and therefore, the user can obtain a feeling of security.

After S312, at S313, the server unit 201 of the image capturing apparatus 100 terminates the Web service. Next, at S314, the save unit 202 of the image capturing apparatus 100 sets the save destination of the captured image file to the normal save area 105*a*. Next, at S315, the save unit 202 of the image capturing apparatus 100 deletes the temporary save area 105*b* generated at S305 from the storage medium 105. By deleting the temporary save area 105*b*, it is made possible to prevent a user of the image capturing apparatus 100 from accessing the captured image file based on an image capturing commission thereafter. After S315, the image capturing system 1 terminates the processing of the sequence diagram shown in FIG. 3, that is, the series of processing in the image capturing by the image capturing apparatus 100.

In the above, explanation is given on the assumption that the deletion completion screen 602 is displayed in a case where the deletion of the captured image file is completed at S311, but it may also be possible to design a configuration so that the deletion completion screen 602 is displayed in a case where the deletion of the temporary save area 105*b* is completed. Further, explanation is given on the assumption that the processing at S313 is performed before the processing at S314, but the processing at S313 may be performed at any timing provided that the timing is after the processing at S312. Further, explanation is given on the assumption that the processing at S314 is performed after the processing at S313, but the processing at S313 may be performed at any timing provided that the timing is after the "YES" button on the termination check screen 601 is pressed down. Further, explanation is given on the assumption that the processing at S315 is performed after the processing at S314, but the processing at S315 may be performed at any timing provided that the timing is after the "YES" button on the termination check screen 601 is pressed down.

Further, explanation is given on the assumption that the connection between the image capturing apparatus 100 and the information processing apparatus 150 continues from the establishment of the connection until the breakage of the connection, but the image capturing apparatus 100 and the information processing apparatus 150 may be connected only in a case where communication is necessary between both the apparatuses. In this case, the above-described connection period corresponds to the period from the acceptance of the request for image capturing commission in the image capturing apparatus 100 until the completion of the image capturing based on the image capturing commission and the non-connection period corresponds to the period other than the connection period.

Further, in a case of the image capturing during the connection period, it may also be possible for the save unit 202 of the image capturing apparatus 100 to obtain a captured image file including information indicating that the captured image file is one based on an image capturing commission in the attribute information on the captured image file. In this case, at S310, it may also be possible for the save unit 202 of the image capturing apparatus 100 to delete the captured image file including the information in the attribute information. Here, the attribute information on the captured image file is, for example, information in the Exif (Exchangeable image file) format in the captured image file. As described above, by including information indicating that the captured image file is one based on an image capturing commission in the attribute of the captured image file, it is possible for a user of the information processing apparatus 150 to check whether or not the captured image file is one based on an image capturing commission.

As above, the image capturing apparatus 100 deletes the captured image file obtained based on an image capturing commission in a case where the connection established with the information processing apparatus 150 is broken, that is, in a case where the image capturing based on an image capturing commission is terminated. According to the image capturing apparatus 100 such as this, it is possible to securely delete the captured image file obtained based on an image capturing commission from the image capturing apparatus 100, and therefore, it is possible to suppress the captured image file from being used for another purpose without the permission of a person having given the image capturing commission while suppressing a complicated work in a case of receiving the image capturing commission. Further, the image capturing apparatus 100 generates the temporary save area 105*b* in a case of accepting a request for image capturing commission and deletes the temporary save area 105*b* in a case of terminating the image capturing based on the image capturing commission. According to the image capturing apparatus 100 such as this, it is not necessary to secure the temporary save area 105*b*, which is not necessary, during the non-connection period, and therefore, it is possible to increase the capacity of the normal save area 105*a*. Further, the image capturing apparatus 100 saves the captured image file based on an image capturing commission in the temporary save area 105*b* different from the normal save area 105*a*. According to the image capturing apparatus 100 such as this, it is possible for a user of the image capturing apparatus 100 to manage the captured image file based on normal image capturing and the captured image file based on an image capturing commission separately for each save area. Because of this, it is possible to suppress a user of the image capturing apparatus 100 from erroneously deleting the captured image file saved in the normal save area 105*a*.

In the present embodiment, an aspect is explained in which a captured image file is saved in the storage medium 105 of the image capturing apparatus 100, but the save destination of a captured image file may be a storage device that is arranged outside the image capturing apparatus 100, such as a cloud storage service. In this case, it may also be possible for the image capturing apparatus 100 to delete the captured image file saved in an external storage device or delete the save area of the captured image file in the storage device in a case of terminating the image capturing based on an image capturing commission. By designing the configuration such as this, it is also possible to delete the captured image file saved in an external storage device as in the case of the captured image file saved in the temporary save area 105*b* of the storage device 105 of the image capturing apparatus 100.

Further, in the present embodiment, an example is shown in which access to a captured image file is disabled thereafter by deleting the captured image file, but it is not necessarily required to delete the captured image file. For example, in a case where the captured image file is deleted from the storage medium 105 of the image capturing apparatus 100, it is no longer possible to access the captured image file again. However, in a case where the connection between the image capturing apparatus 100 and the information processing apparatus 150 is broken suddenly, it may happen sometimes that the captured image file is deleted from the storage medium 105 of the image capturing apparatus 100 unintentionally. Alternatively, after performing deletion processing of the captured image file, there is a case where a user of the information processing apparatus 150 desires to cancel the deletion processing, or the user desires retransmission of the deleted captured image file.

Consequently, for example, it may also be possible to configure the image capturing apparatus 100 so that the captured image file based on an image capturing commission is concealed based on an encryption key only the information processing apparatus 150 or a user of the information processing apparatus 150 may know. By the concealment such as this, it is possible to disable a user of the image capturing apparatus 100 from accessing the captured image file thereafter. Further, by the concealment such as this, it is possible to bring about the state where a user of the image capturing apparatus 100 can access the captured image file saved in the image capturing apparatus 100 only in the period during which the information processing apparatus 150 is connected to the image capturing apparatus 100, thereby enabling retransmission of the captured image file.

Embodiment 2

The image capturing apparatus 100 according to Embodiment 1 deletes the captured image file obtained based on an image capturing commission in a case where the connection based on the image capturing commission between the image capturing apparatus 100 and the information processing apparatus 150 is broken. In Embodiment 2, an aspect is explained in which the information processing apparatus 150 makes a request to delete a captured image file to the image capturing apparatus 100 and the image capturing apparatus 100 deletes the captured image file in a case of receiving the deletion request. The hardware configuration and the function configuration of the image capturing apparatus 100 and the information processing apparatus 150 in the image capturing system 1 according to Embodiment 2 are the same as those of the image capturing apparatus 100 and the information processing apparatus 150 in the image capturing system 1 according to Embodiment 1, and therefore, explanation is omitted.

Figure 7:
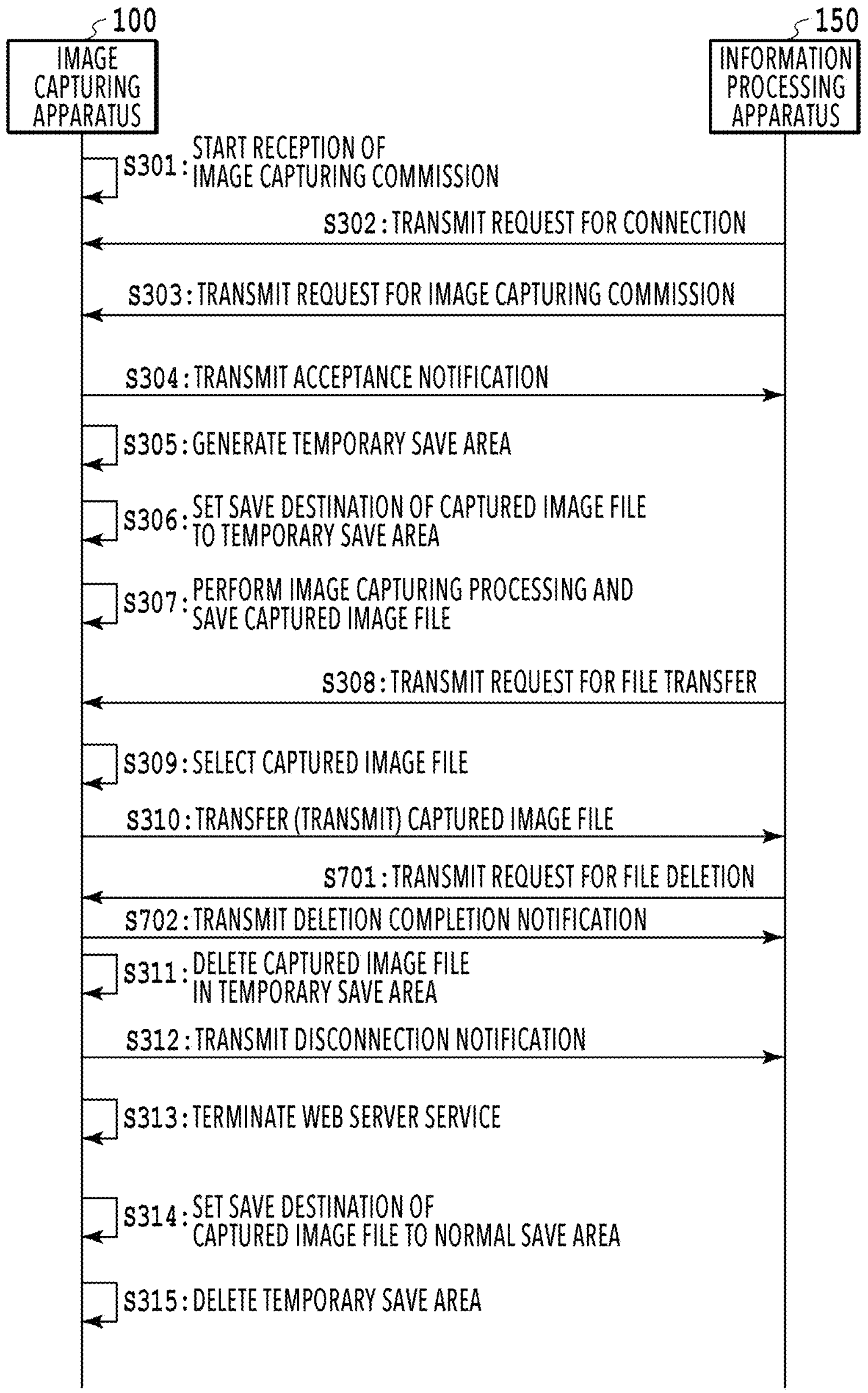
FIG. 7 is a sequence diagram showing one example of a flow of processing of an image capturing system according to Embodiment 2.
Figure 8:
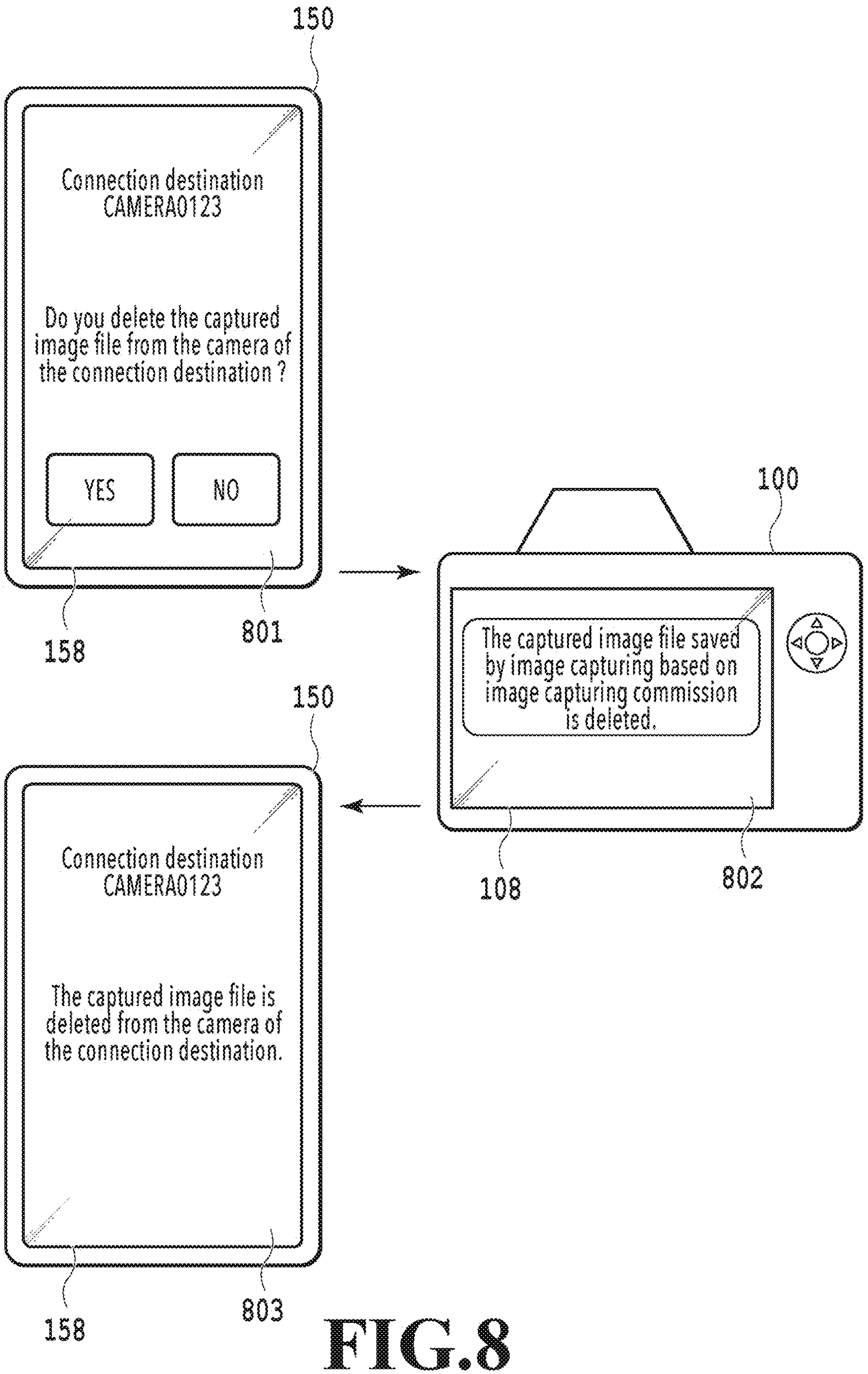
FIG. 8 is a diagram showing one example of screen transition according to Embodiment 2.

With reference to FIG. 7 and FIG. 8, processing of the image capturing apparatus 100 and the information processing apparatus 150 according to Embodiment 2 (in the following, simply called "image capturing apparatus 100 and information processing apparatus 150") during the connection period is explained. FIG. 7 is a sequence diagram showing one example of a flow of processing of the image capturing system 1 according to Embodiment 2 (in the following, simply called "image capturing system 1"). FIG. 8 is a diagram showing one example of screen transition on the display unit 108 of the image capturing apparatus 100 and on the display unit 158 of the information processing apparatus 150 according to Embodiment 2. In FIG. 7, to the same processing as the processing of the sequence diagram shown in FIG. 3, the same symbol is attached and explanation thereof is omitted.

First, by the image capturing apparatus 100 or the information processing apparatus 150, the processing at S301 to S310 is performed. After the information processing apparatus 150 receives the data of the captured image file transmitted at S310, the client unit 251 of the information processing apparatus 150 transmits a request to delete the captured image file (in the following, called "file deletion request") to the image capturing apparatus 100 at S701. Specifically, in a case of receiving the data of the captured image file, the information processing apparatus 150 displays a deletion request screen 801 on the display unit 158, which is for checking whether or not to delete the captured image file based on an image capturing commission saved in the temporary save area 105*b* of the storage medium 105. The deletion request screen 801 includes, for example, a "YES" button indicating that a request to delete the captured image file is made to the image capturing apparatus 100 and a "NO" button indicating that a request to delete the captured image file is not made.

In a case where a user of the information processing apparatus 150 presses down the "YES" button on the deletion request screen 801 by using the information input unit 159, a file deletion request is transmitted from the information processing apparatus 150 to the image capturing apparatus 100. The file deletion request transmitted from the information processing apparatus 150 is received by the server unit 201 of the image capturing apparatus 100. In a case of receiving the file deletion request, the image capturing apparatus 100 performs the processing at S311 and deletes the captured image file saved in the temporary save area 105*b* of the storage medium 105. In a case of completing the deletion of the captured image file, the image capturing apparatus 100 displays a deletion completion screen 802 on the display unit 108, which indicates that the deletion of the captured image file saved in the temporary save area 105*b* of the storage medium 105 has been completed.

After S311, at S702, the server unit 201 of the image capturing apparatus 100 transmits a notification indicating that the captured image file based on the image capturing commission has been deleted (in the following, called "deletion completion notification") to the information processing apparatus 150. The deletion completion notification transmitted from the image capturing apparatus 100 is received by the client unit 251 of the information processing apparatus 150. In a case of receiving the deletion completion notification, the information processing apparatus 150 displays a deletion completion screen 803 on the display unit 158, which indicates that the captured image file saved in the image capturing apparatus 100 has been deleted.

After S702, by the image capturing apparatus 100 or the information processing apparatus 150, the processing at S312 to S315 is performed. After S315, the image capturing system 1 terminates the processing of the sequence diagram shown in FIG. 7, that is, the series of processing in the image capturing by the image capturing apparatus 100. It may also be possible for the information processing apparatus 150 to display a disconnection completion screen not shown schematically on the display unit 158, which indicates that the connection with the image capturing apparatus 100 has been broken, in a case of receiving a disconnection notification transmitted from the image capturing apparatus 100 at S312.

As above, the image capturing apparatus 100 deletes the captured image file obtained and saved based on an image capturing commission in accordance with a request to delete the captured image file from the information processing apparatus 150. According to the image capturing system 1 such as this, it is possible for a user of the information processing apparatus 150 to make a request to delete a captured image file explicitly or voluntarily.

Embodiment 3

The image capturing apparatus 100 according to Embodiment 1 and Embodiment 2 deletes the captured image file based on an image capturing commission, which is saved in the temporary save area 105*b*, after transferring the captured image file to the information processing apparatus 150. In Embodiment 3, an aspect is explained in which in a case where there is a request to save a captured image file from the information processing apparatus 150, the image capturing apparatus 100 saves the captured image file saved in the temporary save area 105*b* in the normal save area 105*a*. By saving a captured image file in the normal save area 105*a*, it is made possible for a user of the image capturing apparatus 100 to normally access the captured image file thereafter. The hardware configuration and the function configuration of the image capturing apparatus 100 and the information processing apparatus 150 in the image capturing system 1 according to Embodiment 3 are the same as those of the image capturing apparatus 100 and the information processing apparatus 150 in the image capturing system 1 according to Embodiment 1 or Embodiment 2, and therefore, explanation thereof is omitted.

Figure 9:
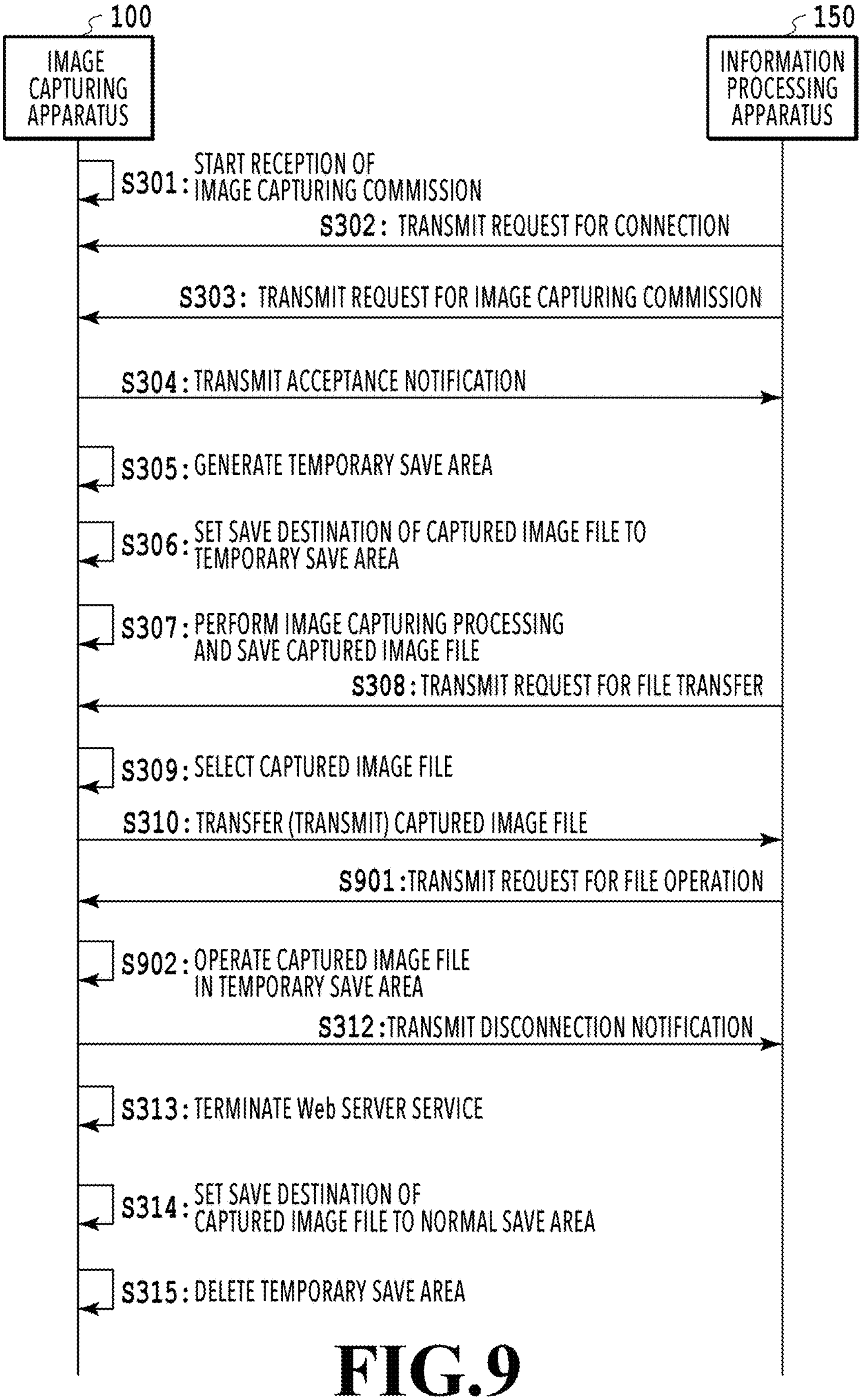
FIG. 9 is a sequence diagram showing one example of a flow of processing of an image capturing system according to Embodiment 3.
Figure 10:
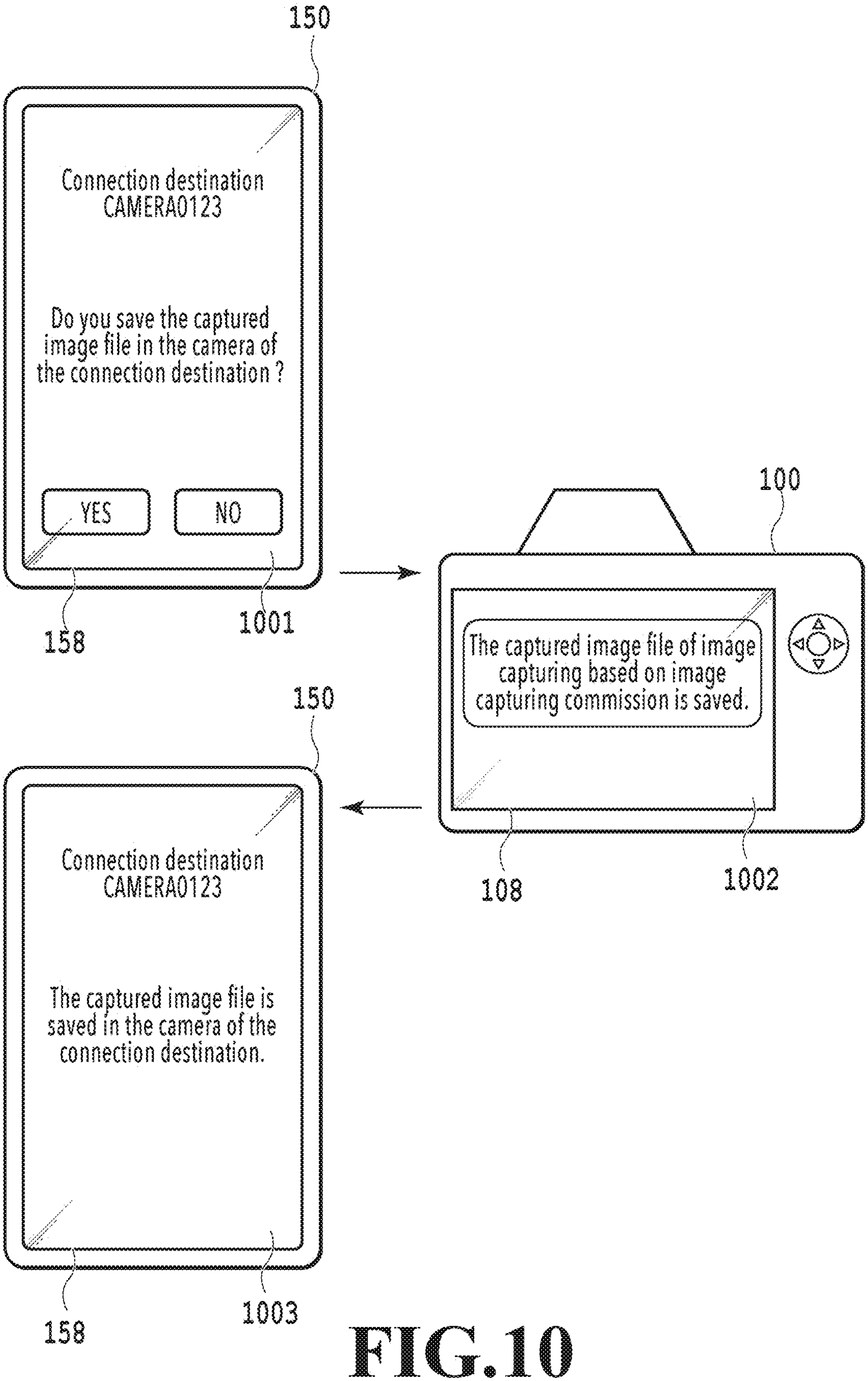
FIG. 10 is a diagram showing one example of screen transition according to Embodiment 3.
Figure 11:
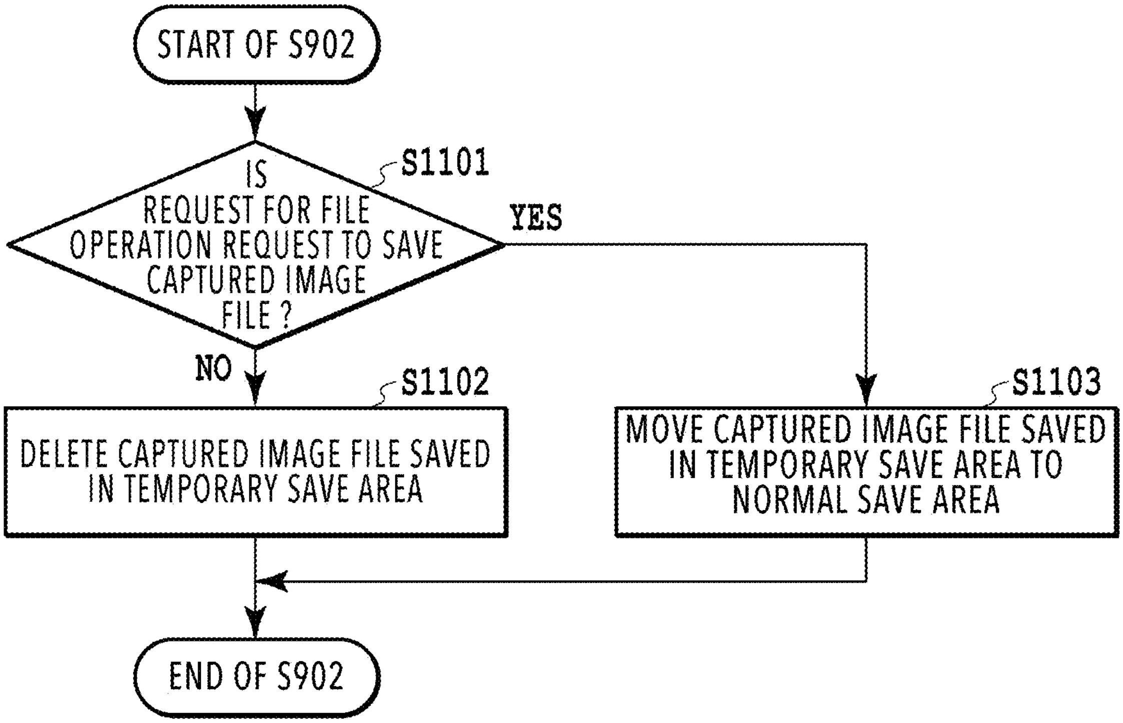
FIG. 11 is a flowchart showing one example of a processing flow at S902 shown in FIG. 9.

With reference to FIG. 9 to FIG. 11, processing of the image capturing apparatus 100 and the information processing apparatus 150 according to Embodiment 3 (in the following, simply called "image capturing apparatus 100 and information processing apparatus 150") during the connection period is explained. FIG. 9 is a sequence diagram showing one example of a flow of processing of the image capturing system 1 according to Embodiment 3 (in the following, simply called "image capturing system 1"). FIG. 10 is a diagram showing one example of screen transition on the display unit 108 of the image capturing apparatus 100 and on the display unit 158 of the information processing apparatus 150 according to Embodiment 3. In FIG. 9, to the same processing as the processing of the sequence diagram shown in FIG. 3 or FIG. 7, the same symbol is attached and explanation thereof is omitted.

First, by the image capturing apparatus 100 or the information processing apparatus 150, the processing at S301 to S310 is performed. After the information processing apparatus 150 receives the data of the captured image file transmitted at S310, the client unit 251 of the information processing apparatus 150 transmits a request to operate the captured image file (in the following, called "file operation request") to the image capturing apparatus 100 at S901. Specifically, in a case of receiving the data of the captured image file, the information processing apparatus 150 displays a save check screen 1001 on the display unit 158, which is for checking whether or not to save the captured image file obtained by the image capturing apparatus 100 based on the image capturing commission in the storage medium 105 of the image capturing apparatus 100. For example, the save check screen 1001 includes a "YES" button indicating that a request to save the captured image file is made to the image capturing apparatus 100 and a "NO" button indicating that a request to save the captured image file is not made.

In a case where a user of the information processing apparatus 150 presses down the "YES" button on the save check screen 1001 by using the information input unit 159, a request to save the captured image file as a file operation request is transmitted to the image capturing apparatus 100 from the information processing apparatus 150. On the other hand, in a case where a user of the information processing apparatus 150 presses down the "NO" button on the save check screen 1001, for example, a request to delete the captured image file as a file operation request is transmitted to the image capturing apparatus 100 from the information processing apparatus 150. The file operation request transmitted from the information processing apparatus 150 is received by the server unit 201 of the image capturing apparatus 100. In a case of receiving the file operation request, the image capturing apparatus 100 performs a file operation corresponding to the file operation request for the captured image file saved in the temporary save area 105*b* of the storage medium 105.

With reference to FIG. 11, details of the processing at S902 by the image capturing apparatus 100 are explained. FIG. 11 is a flowchart showing one example of a flow of a series of processing in the file operation of a captured image file by the image capturing apparatus 100 according to Embodiment 3 and is a flowchart showing one example of a processing flow at S902 shown in FIG. 9. First, at S1101, the save unit 202 of the image capturing apparatus 100 determines whether or not the file operation request received by the server unit 201 of the image capturing apparatus 100 is a request to save the captured image file.

In a case where it is determined that the file operation request is a request to save the captured image file at S1101, the save unit 202 of the image capturing apparatus 100 moves the captured image file saved in the temporary save area 105*b* of the storage medium 105 to the normal save area 105*a*. In this case, it may also be possible for the save unit 202 to copy the captured image file saved in the temporary save area 105*b* of the storage medium 105 to the normal save area 105*a*.

After S1103, it may also be possible for the image capturing apparatus 100 to display a save completion screen 1002 on the display unit 108, which indicates that the captured image file saved in the temporary save area 105*b* has been saved in the normal save area 105*a*. Further, after S1103, it may also be possible for the server unit 201 of the image capturing apparatus 100 to transmit a save completion notification indicating that the captured image file based on the image capturing commission has been saved in the storage medium 105 of the image capturing apparatus 100. In this case, the save completion notification transmitted from the image capturing apparatus 100 is received by the client unit 251 of the information processing apparatus 150. Further, in a case where the information processing apparatus 150 receives the save completion notification, it may also be possible for the information processing apparatus 150 to display the save completion screen 1002 on the display unit 158, which indicates that the captured image file based on the image capturing commission has been saved in the storage medium 105 of the image capturing apparatus 100.

In a case where it is determined that the file operation request is not a request to save the captured image file at S1101, for example, in a case where the file operation request is a request to delete the captured image file, at S1102, the save unit 202 deletes the captured image file saved in the temporary save area 105*b*. After S1102, it may also be possible for the image capturing apparatus 100 to display a screen (for example, the deletion completion screen 802 shown in FIG. 8) on the display unit 108, which indicates that the captured image file saved in the temporary save area 105*b* has been deleted from the storage medium 105. Further, after S1102, it may also be possible for the server unit 201 of the image capturing apparatus 100 to transmit a deletion completion notification indicating that the captured image file based on the image capturing commission has been deleted from the storage medium 105 to the information processing apparatus 150. In this case, the deletion completion notification transmitted from the image capturing apparatus 100 is received by the client unit 251 of the information processing apparatus 150. Further, in a case where the information processing apparatus 150 receives the deletion completion notification, it may also be possible for the information processing apparatus 150 to display a screen (for example, the deletion completion screen 803) on the display unit 158, which indicates that the captured image file based on the image capturing commission has been deleted from the storage medium 105 of the image capturing apparatus 100.

After S1102 or S1103, the image capturing apparatus 100 terminates the processing of the flowchart shown in FIG. 11, that is, the processing at S902 shown in FIG. 9. After S902, by the image capturing apparatus 100 or the information processing apparatus 150, the processing at S312 to S315 is performed. After S315, the image capturing system 1 terminates the processing of the sequence diagram shown in FIG. 9, that is, the series of processing in the image capturing by the image capturing apparatus 100.

In a case where image capturing based on the image capturing commission is performed repeatedly following S902, that is, in a case where the processing at S307 to S902 is performed repeatedly after S902, the processing at S901 may be omitted in the repetitive processing. For example, in a case where the file operation request at S901 for the first time is a request to save the captured image file, the save unit 202 of the image capturing apparatus 100 sets the save destination of the captured image file to the normal save area 105*a* and saves the subsequent captured image files in the normal save area 105*a*. Further, the above-described explanation is given on the assumption that the processing at S901 is performed after S310, but the processing at S901 may be performed at any timing provided that the timing is between the processing at S304 and the processing at S902. For example, in a case where the processing at S901 is performed before the processing at S306, it may also be possible for the image capturing apparatus 100 to set the save destination of the captured image file to the normal save area 105*a* at S306. That is, in this case, the image capturing apparatus 100 saves all the captured image files including the captured image file corresponding to the first image capturing based on the image capturing commission in the normal save area 105*a*.

Further, in the above, explanation is given on the assumption that the file operation request includes a request to delete the captured image file and a request to save the captured image file at S901, but it may also be possible to design a configuration so that only the file operation request corresponding to the save request is transmitted. Specifically, for example, a configuration is designed so that the file operation request is not transmitted in a case where the "NO" button on the save check screen 1001 is pressed down by a user of the information processing apparatus 150. In this case, for example, on a condition that the image capturing apparatus 100 does not receive the file operation request before a predetermined time elapses from the processing at S310, it is sufficient for the image capturing apparatus 100 to delete the captured image file by regarding that no agreement is obtained from the user of the information processing apparatus 150 on the save of the captured image file.

According to the image capturing apparatus 100 configured as above, it is also possible to save and keep the captured image file based on the image capturing commission in the image capturing apparatus 100, not only to delete the captured image file. For example, there is a case where a user of the information processing apparatus 150 permits a user of the image capturing apparatus 100 to be provided with the captured image file obtained by the image capturing based on the image capturing commission. In the case such as this, it is possible for the user of the information processing apparatus 150 to explicitly or voluntarily instruct the save of the captured image file in the image capturing apparatus 100 by using the save check screen 1001 or the like. In a case where there is a request to save the captured image file made to the image capturing apparatus 100 by the information processing apparatus 150, it is possible for the image capturing apparatus 100 to save the captured image file in the normal save area 105*a* in which the captured image file is not deleted. Due to this, the captured image file obtained by the image capturing based on the image capturing commission is no longer deleted from the image capturing apparatus 100.

OTHER EMBODIMENTS

Some embodiment(s) of the present disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, in a case where a temporary image capturing commission is received, it is possible to suppress a captured image file from being used for another purpose without permission of a person having given an image capturing commission while suppressing a complicated work.

While the present disclosure has described exemplary embodiments, it is to be understood that some embodiments of the disclosure are not limited to the disclosed exemplary embodiments. The scope of the following claims is to be accorded the broadest interpretation so as to encompass all such modifications and equivalent structures and functions.

This application claims priority to Japanese Patent Application No. 2023-181220, filed on Oct. 20, 2023, which is hereby incorporated by reference wherein in its entirety.

What is claimed is:

1. An image capturing apparatus comprising:
one or more hardware processors; and
one or more memories storing one or more programs configured to be executed by the one or more hardware processors, the one or more programs including instructions to:
receive a request for image capturing commission from an information processing apparatus;
save a captured image file obtained by image capturing;
transmit the captured image file, to the information processing apparatus;
disable access to the saved captured image file, by concealing the saved captured image file based on an encryption key;
receive a request for enabling, which is a commission to enable access to the saved captured image file, from the information processing apparatus and
save, in a case where the request for enabling is received, the saved captured image file in a state where access to the saved captured image file is enabled
save a captured image file which is obtained by image capturing in a case where the request for image capturing commission is not received in a normal save area different from a temporary save area where the captured image file is saved in a case where the request for image capturing commission is received; and
copy or move, in a case where the request for enabling is received, the captured image file saved in the temporary save area to the normal save area.

2. The image capturing apparatus according to claim 1, wherein
the one or more programs further include instructions to:
save a captured image file which is obtained by image capturing in a case where the request for image capturing commission is not received, in a save area which is different from a save area where the captured image file in a case where the request for image capturing commission is received.

3. The image capturing apparatus according to claim 2, wherein
the one or more programs further include instructions to:
generate a temporary save area to save the commissioned captured image file in a case where the request for image capturing commission is received; and
delete the temporary save area in a case where image capturing corresponding to the request for image capturing commission is terminated.

4. The image capturing apparatus according to claim 1, wherein
the one or more programs further include instructions to:

append information indicating being the captured image file based on the request for image capturing commission on the captured image file.

5. The image capturing apparatus according to claim 1, wherein the one or more programs further include instructions to:

receive a request for disabling, which is a commission to disable access to the saved captured image file that is saved and disabling access to the saved captured image file is performed in a case where the request for commission of disabling is received.

6. The image capturing apparatus according to claim 1, wherein disabling access to the captured image file is performed for the captured image file that is saved during a period from reception of the request for image capturing commission to termination of image capturing corresponding to the request for image capturing commission in a case where image capturing corresponding to the request for image capturing commission is terminated.

7. The image capturing apparatus according to claim 1, wherein the one or more programs further include instructions to:

delete the saved captured image file.

8. The image capturing apparatus according to claim 1, wherein the one or more programs further include instructions to:

conceal the saved captured image file that is saved based on an encryption key.

9. The image capturing apparatus according to claim 1, wherein the one or more programs further include instructions to:

transmit, in a case where access to the saved captured image file has been disabled, a notification indicating that access to the saved captured image file has been disabled to the information processing apparatus.

10. An image capturing system comprising:

an image capturing apparatus and an information processing apparatus, wherein the image capturing apparatus receives a request for image capturing commission from an information processing apparatus;

saves a captured image file obtained by image capturing;

transmits the captured image file, to the information processing apparatus;

disables access to the saved captured image file, by concealing the saved captured image file based on an encryption key, receives a request for enabling, which is a commission to enable access to the saved captured image file, from the information processing apparatus;

saves, in a case where the request for enabling is received, the saved captured image file in a state where access to the saved captured image file is enabled;

saves a captured image file which is obtained by image capturing in a case where the request for image capturing commission is not received in a normal save area different from a temporary save area where the captured image file is saved in a case where the request for image capturing commission is received; and copies or moves, in a case where the request for enabling is received, the captured image file saved in the temporary save area to the normal save area, the information processing apparatus transmits the request for image capturing commission to the image capturing apparatus; and receives the captured image file from the image capturing apparatus.

11. The image capturing system according to claim 10, wherein the image capturing apparatus transmits, in a case where access to the saved captured image file has been disabled, a notification indicating that access to the saved captured image file has been disabled to the information processing apparatus, and the information processing apparatus receives the notification, and presents that access to the saved captured image file has been disabled to a user of the information processing apparatus.

12. The image capturing system according to claim 10, wherein the information processing apparatus transmits a request for disabling, which is a commission to disable access to the saved captured image file, to the image capturing apparatus, and the image capturing apparatus receives the request for disabling that is transmitted from the information processing apparatus and disables access to the saved captured image file.

13. The image capturing system according to claim 10, wherein the information processing apparatus transmits a request for enabling, which is a commission to enable access to the saved captured image file, to the information processing apparatus, and the image capturing apparatus receives the request for enabling that is transmitted from the information processing apparatus, and save the saved captured image file in a state where access to the saved captured image file that is saved is enabled.

14. The image capturing system according to claim 13, wherein the image capturing apparatus transmits a notification indicating that access to the saved captured image file has been enabled to the information processing apparatus, and the information processing apparatus receives the enabling completion notification and presents that access to the saved captured image file has been enabled to a user of the information processing apparatus.

15. A control method of an image capturing apparatus, the control method comprising:

receiving a request for image capturing commission from an information processing apparatus;

saving a captured image file obtained by image capturing;

transmitting the captured image file, to the information processing apparatus;

disabling access to the saved captured image file, by concealing the saved captured image file based on an encryption key;

receiving a request for enabling, which is a commission to enable access to the saved captured image file, from the information processing apparatus;

saving, in a case where the request for enabling is received, the saved captured image file in a state where access to the saved captured image file is enabled;

saving a captured image file which is obtained by image capturing in a case where the request for image capturing commission is not received in a normal save area different from a temporary save area where the captured image file is saved in a case where the request for image capturing commission is received; and copying or moving, in a case where the request for enabling is received, the captured image file saved in the temporary save area to the normal save area.

* * * * *